UNITED STATES PATENT OFFICE.

FRANZ WEBEL, OF MANNHEIM, GERMANY, ASSIGNOR TO BADISCHE ANILIN & SODA FABRIK, OF LUDWIGSHAFEN-ON-THE-RHINE, GERMANY, A CORPORATION.

PRODUCING DIOLEFINS.

1,026,418. Specification of Letters Patent. Patented May 14, 1912.

No Drawing. Application filed January 30, 1912. Serial No. 674,417.

*To all whom it may concern:*

Be it known that I, FRANZ WEBEL, subject of the King of Bavaria, residing at Mannheim, Germany, have invented new and useful Improvements in Producing Diolefins, of which the following is a specification.

In the "*Journal für Praktische Chemie*", (2), Vol. 55, page 5, Ipatieff has described the production of a particular diolefin, viz. of isoprene, by heating dibrom-isopentane with alcoholic potash. I have found, however, that I can obtain much better yields of diolefins by heating a dihalogen paraffin with a solid compound which is capable of splitting off halogen hydrid. The said solid compound may effect the splitting off of the halogen hydrid catalytically or by combining with the halogen hydrid. As instances of compounds which can be employed for thus splitting off halogen hydrid, I mention barium chlorid, nickel chlorid, lead chlorid, alumina and caustic lime. The reaction is preferably carried out by passing a dihalogen paraffin in the state of vapor through a tube or the like containing the heated solid reagent, and it is also advantageous to carry out the reaction under reduced pressure. The tube containing the barium chlorid or the like may, for instance, be from about 1 to 3 yards in length.

The process of this invention is of particular advantage for the production of diolefins which can be employed in the production of artificial caoutchouc and similar bodies, for instance, diolefins which contain four, five, or six carbon atoms.

The following examples will serve to illustrate further the nature of my invention, which, however, is not confined to these examples. The parts are by weight.

Example 1: Vaporize trimethyl-ethylene bromid $$(CH_3)_2CBr-CHBr-CH_3$$

at a pressure of from 15 to 20 millimeters and pass the vapor, slowly, over barium chlorid heated to from 340° to 360° C. Then pass the resulting vapors through a wash-bottle containing dilute lye in order to absorb the hydrogen bromid, and cool with a mixture of carbon dioxid and toluol at minus 80° C. In this way isoprene is obtained of great purity and in very good yield. In a similar manner, isoprene can be obtained from trimethyl-ethylene chlorid $$(CH_3)_2CCl-CHCl-CH_3,$$

or from 2.4-dibrom-2-methyl-butane $$(CH_3)_2CBr-CH_2-CH_2Br,$$

or from 3.4-dibrom-2-methyl-butane $$(CH_3)_2CH-CHBr-CH_2Br,$$

By passing their vapors over barium chlorid at, say from 20 to 50 millimeters pressure, and at a temperature of from 300° to 500° C. Also by starting from 2.3-dibrombutane, the corresponding butadien can be obtained in a similar manner.

Example 2: Pass vaporized trimethylethylene bromid $$(CH_3)_2CBr-CHBr-CH_3,$$

at a pressure of 25 millimeters, over caustic lime heated to from 430° to 450° C. In this way pure isoprene is obtained in good yield.

Example 3: Pass vaporized 2.4-dibrom-2-methyl-butane $$(CH_3)_2CBr-CH_2CH_2Br$$

at a pressure of 30 millimeters, over caustic lime heated to from 450° to 480° C., whereupon isoprene is obtained.

In a manner similar to those given in the above examples, dihalogen-cyclopentenes, such for instance as dipentene dihydrochlorid or the corresponding dihydrobromid, can be converted into the corresponding cyclodiolefins.

Now what I claim is:—

1. The process of producing diolefins by heating a dihalogen paraffin with a solid compound which is capable of splitting off halogen hydrid.

2. The process of producing diolefins by heating a dihalogen paraffin under reduced pressure with a solid compound which is capable of splitting off halogen hydrid.

3. The process of producing isoprene by heating trimethyl-ethylene-bromid with barium chlorid.

4. The process of producing isoprene by heating trimethyl-ethylene bromid with barium chlorid under reduced pressure.

5. The process of producing isoprene by passing vaporized trimethyl-ethylene bromid at a pressure of from 15 to 20 millimeters over barium chlorid at a temperature of from 340° to 360° C.

In testimony whereof I have hereunto set my hand in the presence of two subscribing witnesses.

FRANZ WEBEL.

Witnesses:
A. O. TITTMANN,
J. ALEC. LLOYD.